(12) United States Patent
Morrison et al.

(10) Patent No.: US 10,010,953 B2
(45) Date of Patent: Jul. 3, 2018

(54) WEDGE CLAMP AND INSERT CARTRIDGE FOR CUTTING TOOL

(71) Applicant: Kennametal Inc., Latrobe, PA (US)

(72) Inventors: Michael Glenn Morrison, Tarrs, PA (US); Jeffrey Francis Kovac, Loyalhanna, PA (US)

(73) Assignee: KENNAMETAL INC., Latrobe, PA (US)

( * ) Notice: Subject to any disclaimer, the term of this patent is extended or adjusted under 35 U.S.C. 154(b) by 103 days.

(21) Appl. No.: 14/219,560

(22) Filed: Mar. 19, 2014

(65) Prior Publication Data
US 2015/0266112 A1 Sep. 24, 2015

(51) Int. Cl.
*B23C 5/00* (2006.01)
*B23C 5/22* (2006.01)

(52) U.S. Cl.
CPC .......... *B23C 5/2269* (2013.01); *B23C 5/2273* (2013.01); *B23C 2210/16* (2013.01); *Y10T 407/2284* (2015.01)

(58) Field of Classification Search
CPC ... B23C 5/2437; B23C 5/2441; B23C 5/2444; B23C 5/2448; B23C 5/2451; B23C 5/2265; B23C 5/2269; B23C 5/2278; B23C 5/2286; B23C 5/2291; B23Q 16/003
See application file for complete search history.

(56) References Cited

U.S. PATENT DOCUMENTS

| | | |
|---|---|---|
| 3,798,724 A | 3/1974 | Czopor |
| 4,024,615 A * | 5/1977 | Lieser .................. B23C 5/2444 407/47 |
| 4,533,281 A | 8/1985 | Lacey |
| 4,621,547 A | 11/1986 | Yankoff |
| 4,786,217 A | 11/1988 | Johne |
| 5,193,954 A | 3/1993 | Hunt |
| 5,529,439 A | 6/1996 | Werner et al. |
| 5,567,092 A | 10/1996 | Post |
| 5,735,649 A | 4/1998 | Boscarino et al. |
| 5,800,079 A | 9/1998 | Qvarth |
| 5,942,432 A | 8/1999 | Smith |
| 5,967,706 A | 10/1999 | Hughes, Jr. |
| 6,176,648 B1 | 1/2001 | Mizutani |

(Continued)

FOREIGN PATENT DOCUMENTS

| | | | |
|---|---|---|---|
| DE | 2806079 B1 * | 3/1979 | ........... B23C 5/2444 |
| DE | 3007322 A1 * | 9/1981 | ........... B23C 5/2444 |

(Continued)

OTHER PUBLICATIONS

Non Final Office Action.
(Continued)

*Primary Examiner* — Will Fridie, Jr.
(74) *Attorney, Agent, or Firm* — Ian K. Samways (57) ABSTRACT

A cutting tool includes a pocket with a top wall, a bottom wall, a side wall and a rear wall. The cutting tool has an insert cartridge and a wedge clamp. The threaded member exerts a force vector in a radial direction when threaded into the wedge clamp to place the cutting tool in a locked condition, and the wedge clamp exerts a force vector into the body of the cutting tool radially inward of an adjacent pocket, thereby reducing deflection of the adjacent pocket when the cutting tool is placed in the locked condition.

21 Claims, 6 Drawing Sheets

(56) References Cited

U.S. PATENT DOCUMENTS

| | | | |
|---|---|---|---|
| 6,186,704 B1 | 2/2001 | Hale | |
| 6,234,727 B1 | 5/2001 | Barazani | |
| 6,254,319 B1 * | 7/2001 | Maier | B23C 5/2444 407/45 |
| 6,290,436 B1 | 9/2001 | Qvarth | |
| 6,334,740 B1 | 1/2002 | Qvarth | |
| 6,511,264 B2 | 1/2003 | Ripley | |
| 6,942,432 B2 | 9/2005 | Noggle et al. | |
| 6,971,823 B2 | 12/2005 | Satran et al. | |
| 7,014,393 B2 | 3/2006 | Matheis | |
| 7,086,812 B2 | 8/2006 | Gamble et al. | |
| 7,156,588 B2 | 1/2007 | Elbaz et al. | |
| 7,287,938 B2 | 10/2007 | Raab | |
| 7,311,477 B2 | 12/2007 | Hecht et al. | |
| 7,578,641 B2 | 8/2009 | Andersson et al. | |
| 7,878,738 B2 | 2/2011 | Kammermeier et al. | |
| 8,267,625 B2 | 9/2012 | Hughes | |
| 8,297,890 B2 | 10/2012 | Heinloth et al. | |
| 8,827,598 B2 | 9/2014 | Henry et al. | |
| 2007/0104545 A1 | 5/2007 | Matheis | |
| 2007/0127992 A1 | 6/2007 | Spichtinger et al. | |
| 2009/0297282 A1 | 12/2009 | Mizutani | |
| 2010/0232890 A1 * | 9/2010 | Hughes | B23C 5/06 407/110 |
| 2010/0316453 A1 | 12/2010 | Bronshteyn et al. | |
| 2011/0311326 A1 | 12/2011 | Pantzar | |
| 2012/0210551 A1 | 8/2012 | Yu et al. | |
| 2013/0020093 A1 | 1/2013 | Guidry et al. | |
| 2013/0309025 A1 | 11/2013 | Zimmermann et al. | |

FOREIGN PATENT DOCUMENTS

| | | | |
|---|---|---|---|
| EP | 0997217 A2 * | 5/2000 | B23C 5/207 |
| EP | 0997218 A2 * | 5/2000 | B23C 5/207 |
| GB | 386307 | 1/1933 | |
| GB | 386307 A | 1/1933 | |
| GB | 451816 | 8/1936 | |
| GB | 1222907 | 2/1971 | |
| GB | 1255944 A * | 12/1971 | B23C 5/2444 |
| JP | 2001191208 A | 7/2001 | |
| JP | 2001246515 A | 9/2001 | |
| WO | 9716276 A1 | 5/1997 | |
| WO | 2005120755 A1 | 12/2005 | |

OTHER PUBLICATIONS

Kometric Cartridges and Pockets, 1, 38.
http://leotools.co.in/control/Milling_1.aspx, "Face-Milling Cutter With Wedge-Clamped Indexable Inserts".
Jun. 19, 2015 Office action (3 months) 1 20140003872.
Nov. 27, 2017 First Office Action.

* cited by examiner

WEDGE CLAMP AND INSERT CARTRIDGE FOR CUTTING TOOL

BACKGROUND OF THE INVENTION

Field of the Invention

The invention pertains to the field of cutting tools. More particularly, the invention pertains to a wedge clamp for a cutting tool that directs the wedge clamping force behind the radial seating of an adjacent pocket, thereby eliminating deflection to the adjacent pocket.

Description of Related Art

Conventional cutting tools with insert cartridges use various means for mounting the insert cartridges to the tool body. One known method of clamping an insert cartridge in a pocket of a cutting tool is by means of a wedge clamp. Unfortunately, conventional wedge clamps may cause deflection to adjacent pockets, thereby causing run out issues, and in the case of an adjustable style cutting insert, making it very difficult to zero out the insert tracking.

SUMMARY OF THE INVENTION

The problem of minimizing or eliminating deflection to adjacent pockets is solved by providing a wedge clamp that directs the wedge clamping force behind the radial seating of an adjacent pocket, thereby eliminating deflection to the adjacent pocket.

In one aspect of the invention, a cutting tool includes a body and comprises a cutting tool including a pocket including a top wall, a bottom wall, a side wall and a rear wall. The side wall includes a recess. An insert cartridge includes a top wall, a bottom wall opposite the top wall, a front wall, a rear wall opposite the front wall, and a pair of opposing side walls extending between the top and bottom walls. A wedge clamp includes a top wall, a bottom wall opposite the top wall, a front wall, a rear wall opposite the front wall, and a pair of opposing side walls extending between the top and bottom walls. A threaded member exerts a force vector in a radial direction when threaded into the wedge clamp to place the cutting tool in a locked condition. The wedge clamp exerts a force vector into the body of the cutting tool radially inward of an adjacent pocket, thereby reducing deflection of the adjacent pocket when the cutting tool is placed in the locked condition.

In another aspect of the invention, a cutting tool includes a body and comprises a cutting tool including a pocket including a top wall, a bottom wall, a side wall and a rear wall. The side wall includes a recess. An insert cartridge includes a top wall, a bottom wall opposite the top wall, a front wall, a rear wall opposite the front wall, and a pair of opposing side walls extending between the top and bottom walls. A wedge clamp includes a top wall, a bottom wall opposite the top wall, a front wall, a rear wall opposite the front wall, and a pair of opposing side walls extending between the top and bottom walls. The rear wall includes a cylindrical member extending therefrom. The cylindrical member is received in the recess of the side wall of the pocket. The front wall includes a threaded bore and the cylindrical member including a threaded inner surface for receiving a threaded member. The threaded member causes the wedge clamp to move in a radial direction to place the cutting tool in a locked condition. The movement of the wedge clamp causes the bottom wall of the wedge clamp to engage the top wall of the insert cartridge, thereby causing the wedge clamp to exert a force vector in an axial direction against the insert cartridge, thereby resulting in the downward force vector and a side force vector to be generated by the insert cartridge against the bottom wall and the side wall of the pocket, respectively, thereby securing the insert cartridge in the pocket.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
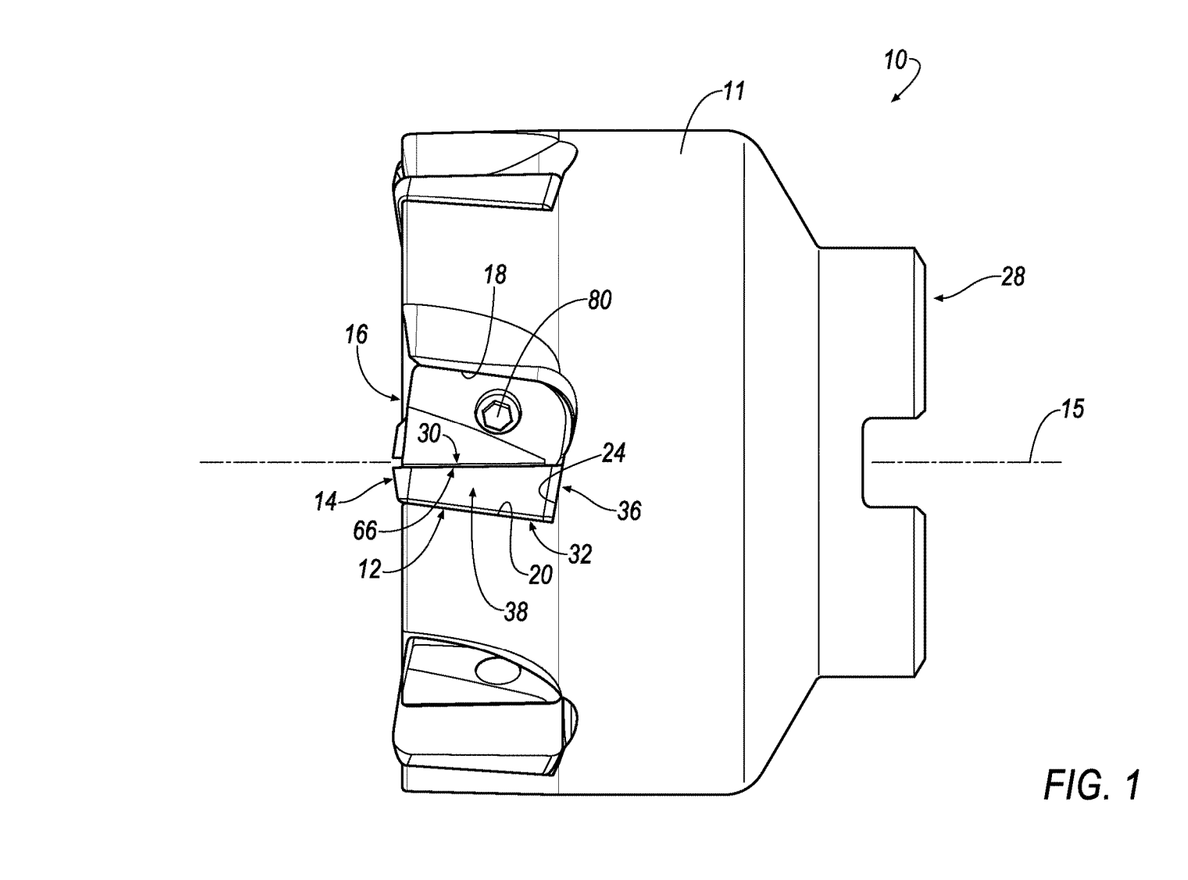
FIG. 1 is a side view of a cutting tool with an insert cartridge and a wedge clamp in accordance with an embodiment of the invention.

Referring now to FIG. 1, a cutting tool 10, for example, a milling cutter, includes a body 11 with a pocket 12 and a wedge clamp, shown generally at 16, according to an embodiment of the invention. It will be appreciated that the cutting tool 10 may include any number of pockets 12, and that the invention is not limited by the number of pockets 12 shown in the illustrated embodiment. Each pocket 12 is capable of receiving an insert cartridge 14 and the wedge clamp 16, shown generally in FIG. 1, respectively. In general, the pocket 12 includes a top wall 18, a bottom wall 20, a side wall 22 (FIG. 5) and a rear wall 24. The side wall 22 and the rear wall 24 engage the insert cartridge 14 when the insert cartridge 14 is mounted in the pocket 12. Specifically, the rear wall 24 acts as a stop for the insert cartridge 14 when the insert cartridge 14 is mounted in the pocket 12 in a locked condition.

Figure 2:
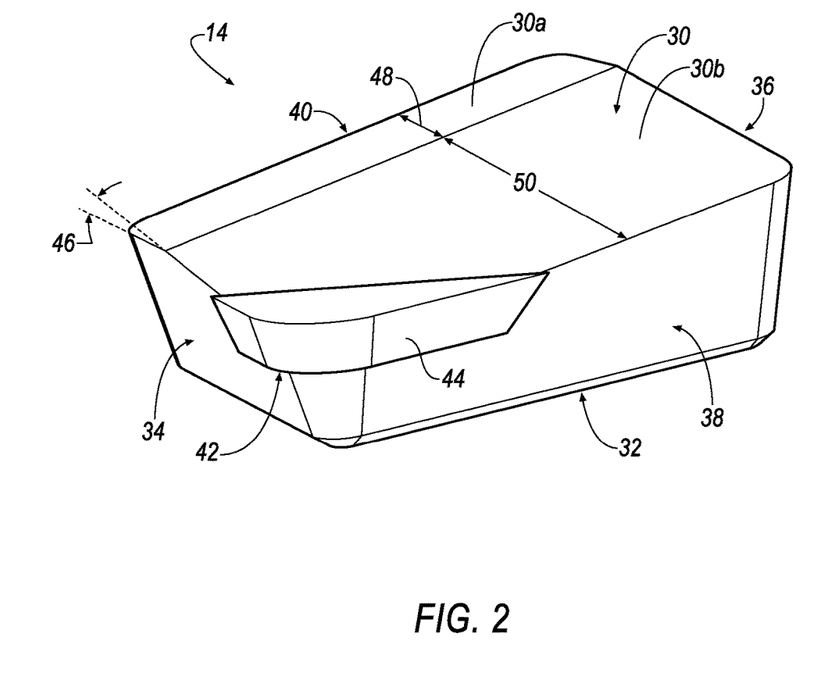
FIG. 2 is an isometric top view of an insert cartridge according to an embodiment of the invention.

Referring now to FIG. 2, the insert cartridge 14 is shown according to an embodiment of the invention. The insert cartridge 14 is generally rectangular in shape having a top wall 30, a bottom wall 32 opposite the top wall 30, a front wall 34, a rear wall 36 opposite the front wall 34, and a pair of opposing side walls 38, 40 extending between the top and bottom walls 30, 32. In general, the top wall 30, the bottom wall 32, the front wall 34, the rear wall 36 and the side walls 38, 40 are substantially planar. An insert pocket 42 is formed in the top wall 30 at an intersection between the front wall 34 and one of the side walls 38, 40 for receiving a blade or cutting insert 44. In the illustrated embodiment, the insert pocket 42 is formed in the top wall 30 between the front wall 34 and the side wall 38. The cutting insert 44 can be mounted in the insert pocket 42 using any well-known means in the art, such as brazing, and the like.

In general, the top wall 30, the bottom wall 32, the front wall 34 and the rear wall 36 are substantially perpendicular to the side walls 38, 40. However, the front wall 34, the rear wall 36 and the side walls 38, 40 can be formed at a small angle with respect to the top and bottom walls 30, 32 to provide clearance for the insert cartridge 16. In one aspect of the invention, the top wall 30 includes a first portion 30a and a second portion 30b that extend between the front and rear walls 34, 36. The first portion 30a extends a first distance 48 from the side wall 40 to the second portion 30b, and the second portion 30b extends a second distance 50 from the first portion 30a to the side wall 38. The second distance 50 is larger than the first distance 48. The first and second portions 30a, 30b are formed at an angle 46 with respect to each other. Specifically, the first portion 30a of the top wall 30 is substantially parallel to the bottom wall 32, whereas the second portion 30b is formed at the angle with respect to the bottom wall 32 (and the first portion 30a). In one embodiment, the angle 46 is in a range between about five (5) degrees and about fifteen degree (15). In other words, the second portion 30b of the insert cartridge 14 causes the insert cartridge 14 to be angled over the second distance 50 from the side wall 38 towards the side wall 40.

Figure 4:
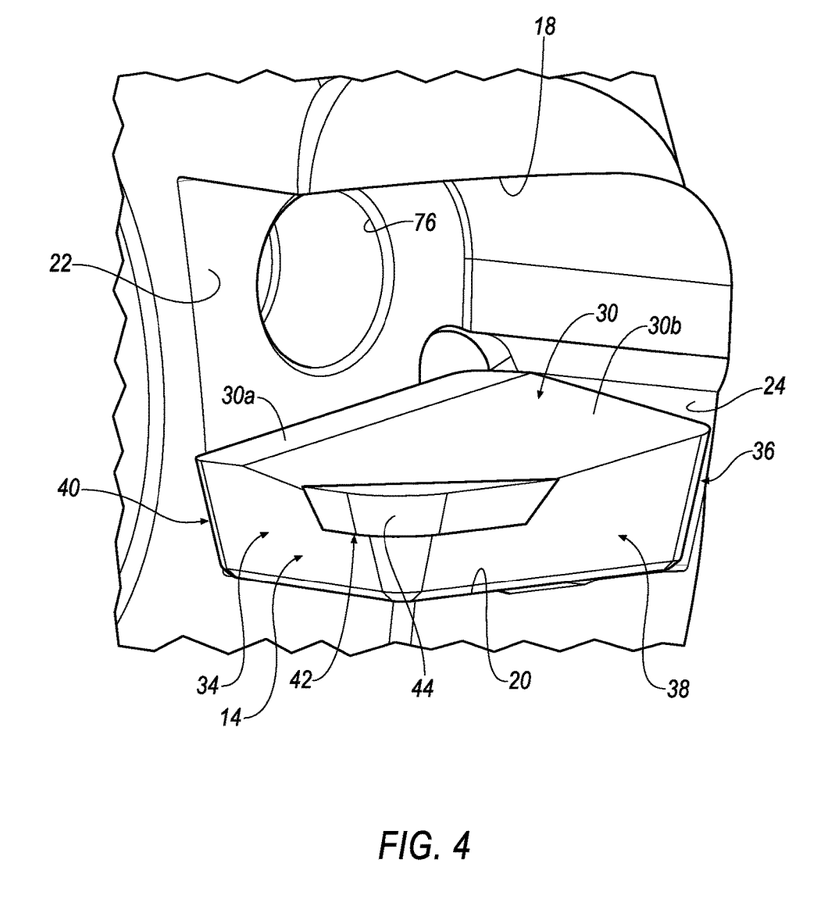
FIG. 4 is an isometric top view of the insert cartridge mounted in the pocket according to an embodiment of the invention.

The second portion 30b of the top wall 30 acts as a seating surface for the wedge clamp 16 to resist the insert cartridge 14 from sliding out of the pocket 12 during a cutting operation. When the insert cartridge 14 and the wedge clamp 16 are in the locked condition, the bottom wall 32 of the insert cartridge 14 engages the bottom wall 20 of the pocket 12, the side wall 40 of the insert cartridge 14 engages the side wall 22 of the pocket, and the rear wall 36 of the insert cartridge 14 engages the rear wall 24 of the pocket 12, as shown in FIGS. 1 and 4.

Figure 3:
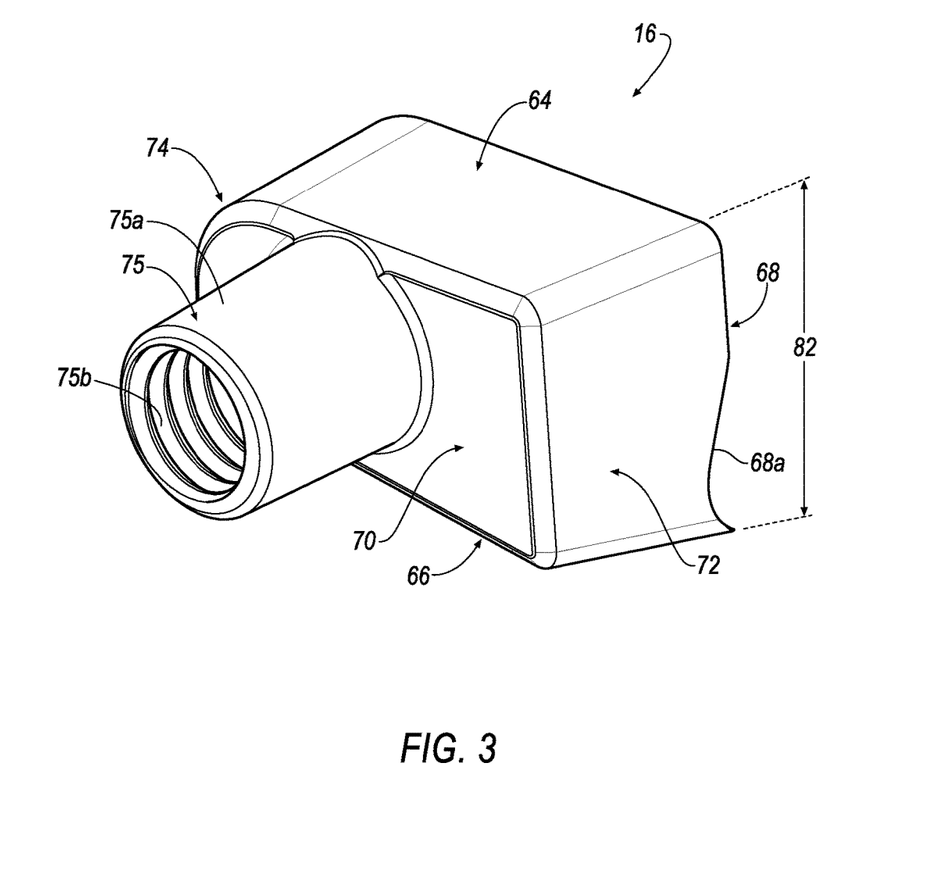
FIG. 3 is an isometric top view of a wedge clamp according to an embodiment of the invention.

Referring now to FIG. 3, the wedge clamp 16 is shown according to an embodiment of the invention. The wedge clamp 16 is generally rectangular in shape having a top wall 64, a bottom wall 66 opposite the top wall 64, a front wall 68, a rear wall 70 opposite the front wall 70, and a pair of opposing side walls 72, 74 extending between the top and bottom walls 64, 66. The front wall 68 may include a facet surface 68a to allow for the evacuation of chips.

Figure 5:
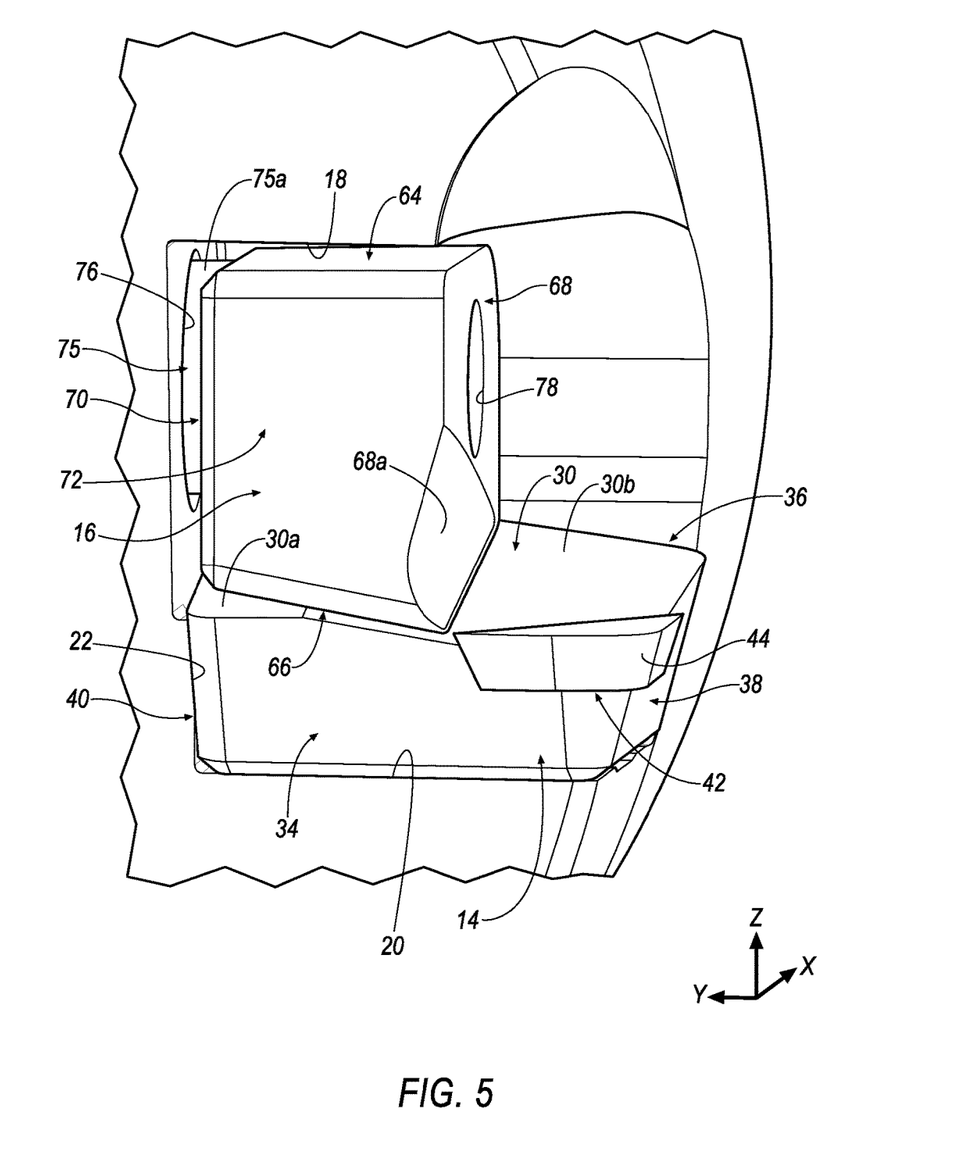
FIG. 5 is an isometric view of the insert cartridge and the wedge clamp when mounted in the pocket in a locked condition.

As shown in FIG. 3, the top wall 64, the bottom wall 66, the rear wall 70 and the side wall 72 are substantially planar, whereas the side wall 74 is arcuate in shape. The rear wall 70 includes a cylindrical member 75 that extends from the rear wall 70 and is capable of being received in a recess 76 formed in the side wall 22 of the pocket 12. The cylindrical member 75 has an outer surface 75a and a threaded inner surface 75b. The cylindrical member 75 is substantially aligned with a threaded bore 78 extending from the front wall 68 to allow a threaded member 80 to be threaded through the aperture 78 and cylindrical member 75 and into the body 11 of the milling cutter 10 to draw the wedge clamp 16 into the pocket 12, as shown in FIG. 5. It should be understood that rotation of the threaded member 80 in one direction causes the wedge clamp 16 to move in a first direction with respect to the insert pocket 12, and rotation of the threaded member 80 is an opposite direction causes the wedge clamp 16 to move in a second, opposite direction with respect to the insert pocket 12.

Referring back to FIG. 3, in another aspect of the invention, the top wall 64 is formed at an angle 82 with respect to the bottom wall 66. In other words, the top wall 64 is not perpendicular with respect to the bottom wall 66 such that a thickness of the wedge clamp 16 is largest proximate the front wall 68 and smallest proximate the rear wall 70. When the insert cartridge 14 and the wedge clamp 16 are in the locked condition, the top wall 64 of the wedge clamp 16 engages the top wall 18 of the pocket 12, and the bottom wall 66 of the wedge clamp 16 engages the top wall 30 of the insert cartridge 14. Specifically, the bottom wall 66 of the wedge clamp 16 engages the second portion 30b of the top wall 30 of the insert cartridge 14, as shown in FIGS. 5 and 6.

Figure 6:
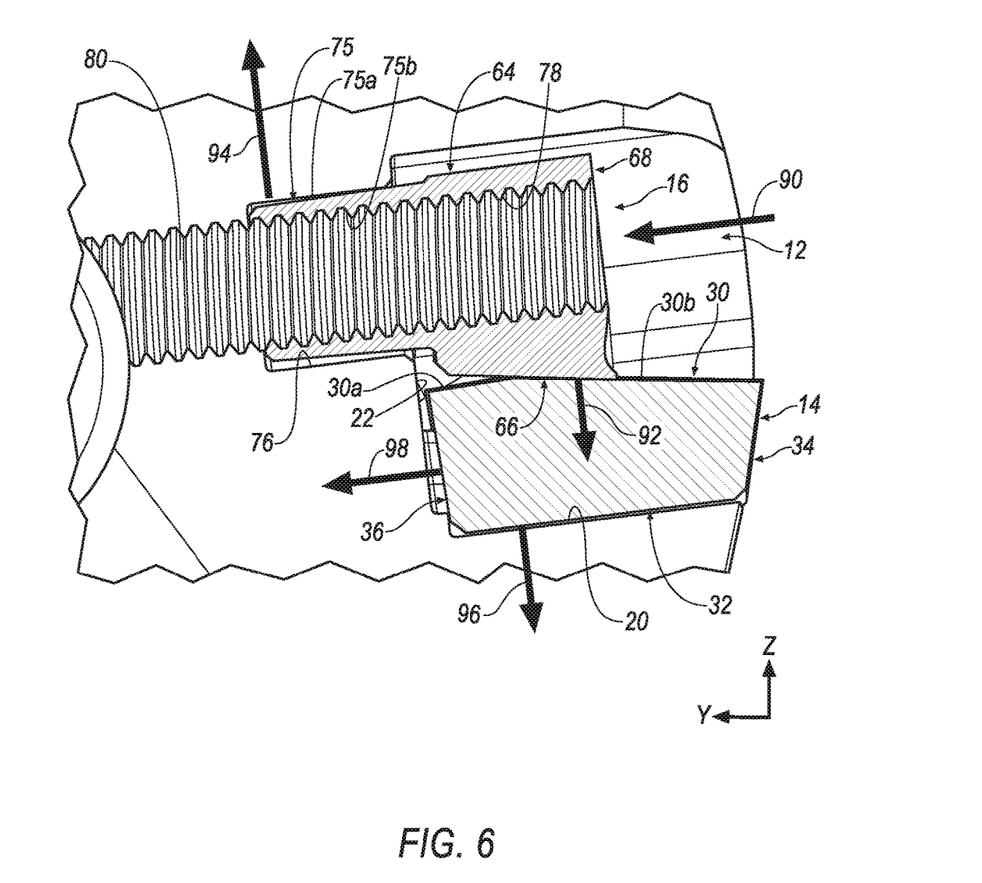
FIG. 6 is a cross-sectional view of the insert cartridge and the wedge clamp when mounted in the pocket in the locked condition.

FIGS. 5 and 6 show the insert cartridge 14 and the wedge clamp 16 mounted in the pocket 12 of the cutting tool 10 in a locked condition. As shown in FIG. 6, as the clamp screw 80 is threaded into the threaded bore 78, a force vector 90 is generated in a radial direction (i.e., along the y-axis), causing the wedge clamp 16 to move in the radial direction relative to the insert cartridge 14. As a result of this relative movement between the insert cartridge 14 and the wedge clamp 16, the bottom wall 66 of the wedge clamp 16 comes into contact with the second portion 30b of the top wall 30 of the insert cartridge 14, causing the wedge clamp 16 to exert a force vector 92 in an axial direction (i.e., in a direction along the z-axis) against the insert cartridge 14, and resulting in the downward and side force vectors 96, 98 to be generated by the insert cartridge 14 against the pocket walls 20, 22, thereby securing the insert cartridge 14 in the pocket 12.

In addition, the cylindrical member 75 of the wedge clamp 16 comes into contact with the recess 76 of the body 11 of the milling cutter 10, causing the wedge clamp 16 to exert a relatively larger force vector 94 against the body 11 of the milling cutter 10. As shown in FIG. 6, this force vector 94 is located radially inward with respect to the adjacent pocket 12 of the milling cutter 10, thereby reducing deflection of the adjacent pocket 12 of the cutting tool 10.

The patents and publications referred to herein are hereby incorporated by reference.

Having described presently preferred embodiments the invention may be otherwise embodied within the scope of the appended claims.

What is claimed is:

1. A cutting tool including a body, the cutting tool comprising:
a pocket including a top wall, a bottom wall, a side wall and a rear wall, the side wall of the pocket including a recess;
an insert cartridge which accommodates a blade or cutting insert, the insert cartridge including a top wall, a bottom wall opposite the top wall, a front wall, a rear wall opposite the front wall of the insert cartridge, a pair of opposing side walls extending between the top wall of the insert cartridge and the bottom wall of the insert cartridge; and
a wedge clamp including a top wall, a bottom wall opposite the top wall of the wedge clamp, a front wall, a rear wall opposite the front wall of the wedge clamp, and a pair of opposing side walls extending between the top wall of the wedge clamp and the bottom wall of the wedge clamp, the rear wall of the wedge clamp including a cylindrical member extending therefrom, the cylindrical member received in the recess of the side wall of the pocket,
wherein a threaded member exerts a first force vector in a radial direction when threaded into the wedge clamp causing the wedge clamp to move in the radial direction relative to the insert cartridge to place the cutting tool in a locked condition,
the cylindrical member being defined by a central longitudinal axis which is parallel to the bottom wall of the pocket,
the radial direction of the first force vector being parallel to the central longitudinal axis of the cylindrical member and to the bottom wall of the pocket, wherein, in the locked condition:
the bottom wall of the wedge clamp engages the top wall of the insert cartridge,
the bottom wall of the insert cartridge engages the bottom wall of the pocket, and
the cylindrical member of the wedge clamp engages the recess of the body and exerts a second force vector into the body of the cutting tool at a location that is radially inward with respect to an adjacent pocket, thereby reducing deflection of the adjacent pocket when the cutting tool is placed in the locked condition,
the second force vector being substantially perpendicular to the first force vector,
the longitudinal axis of the cylindrical member and the bottom wall of the pocket,
wherein the top wall of the insert cartridge includes a first portion extending from one of the pair of opposing side walls of the insert cartridge and a second portion extending from the first portion, the first and second portions not coinciding with a blade or cutting insert,
wherein the second portion is formed at an acute and non-zero angle with respect to the first portion, and
wherein the second portion acts as a seating surface for the wedge clamp to resist the insert cartridge from sliding out of the pocket during a cutting operation.

2. The cutting tool according to claim 1, wherein the front wall of the wedge clamp includes a threaded bore and the cylindrical member includes a threaded inner surface for receiving the threaded member.

3. The cutting tool according to claim 1, wherein the first portion of the top wall of the insert cartridge extends a first distance from the one of the pair of opposing side walls of the insert cartridge and the second portion of the top wall of the insert cartridge extends a second distance from the first portion of the top wall of the insert cartridge.

4. The cutting tool according to claim 1, wherein the insert cartridge further includes an insert pocket formed in the top wall of the insert cartridge at an intersection between the front wall of the insert cartridge and one of the side walls of the insert cartridge for receiving a cutting insert.

5. The cutting tool according to claim 1, wherein the top wall of the wedge clamp is formed at an angle with respect to the bottom wall of the wedge clamp such that a thickness of the wedge clamp is largest proximate the front wall and smallest proximate the rear wall.

6. The cutting tool according to claim 1, wherein the rear wall of the pocket acts as a stop for the insert cartridge when the insert cartridge is mounted in the pocket in the locked condition.

7. A cutting tool including a body, the cutting tool comprising:
a pocket including a top wall, a bottom wall, a side wall and a rear wall, the side wall of the pocket including a recess;
an insert cartridge which accommodates a blade or cutting insert, the insert cartridge including a top wall, a bottom wall opposite the top wall, a front wall, a rear wall opposite the front wall of the insert cartridge, a pair of opposing side walls extending between the top wall of the insert cartridge and the bottom wall of the insert cartridge; and
a wedge clamp including a top wall, a bottom wall opposite the top wall of the wedge clamp, a front wall, a rear wall opposite the front wall of the wedge clamp, and a pair of opposing side walls extending between the top wall of the wedge clamp and bottom wall of the wedge clamp, the rear wall of the wedge clamp including a cylindrical member extending therefrom, the cylindrical member received in the recess of the side wall of the pocket, the front wall of the wedge clamp including a threaded bore and the cylindrical member including a threaded inner surface for receiving a threaded member,
the cylindrical member being defined by a central longitudinal axis which is parallel to the bottom wall of the pocket,
wherein the threaded member causes the wedge clamp to move in a radial direction relative to the insert cartridge to place the cutting tool in a locked condition, and
wherein the movement of the wedge clamp in the radial direction causes the bottom wall of the wedge clamp to engage the top wall of the insert cartridge, thereby causing the wedge clamp to exert a force vector in an axial direction against the insert cartridge, thereby resulting in the downward force vector and a side force vector to be generated by the insert cartridge against the bottom wall of the pocket and the side wall of the pocket, respectively, thereby securing the insert cartridge in the pocket,
wherein the cylindrical member of the wedge clamp engages the recess of the body and exerts a force vector into the body of the cutting tool at a location that is radially inward with respect to an adjacent pocket, thereby reducing deflection of the adjacent pocket when the cutting tool is placed in the locked condition,
wherein the top wall of the insert cartridge includes a first portion extending from one of the pair of opposing side walls of the insert cartridge and a second portion extending from the first portion, the first and second portions not coinciding with a blade or cutting insert,
wherein the second portion is formed at an acute and non-zero angle with respect to the first portion, and
wherein the second portion acts as a seating surface for the wedge clamp to resist the insert cartridge from sliding out of the pocket during a cutting operation.

8. The cutting tool according to claim 7, wherein the threaded member exerts a force vector in a radial direction when threaded into the wedge clamp to place the cutting tool in the locked condition.

9. The cutting tool according to claim 7, wherein the first portion of the top wall of the insert cartridge extends a first distance from the one of the pair of opposing side walls of the insert cartridge and the second portion of the top wall of the insert cartridge extends a second distance from the first portion of the top wall of the insert cartridge.

10. The cutting tool according to claim 7, wherein the insert cartridge further includes an insert pocket formed in the top wall of the insert cartridge at an intersection between the front wall of the insert cartridge and one of the side walls of the insert cartridge for receiving a cutting insert.

11. The cutting tool according to claim 7, wherein the top wall of the wedge clamp is formed at an angle with respect to the bottom wall of the wedge clamp such that a thickness of the wedge clamp is largest proximate the front wall and smallest proximate the rear wall.

12. A cutting tool including a body, the cutting tool comprising:
a pocket including a top wall, a bottom wall, a side wall and a rear wall, the side wall of the pocket including a recess;
an insert cartridge which accommodates a blade or cutting insert, the insert cartridge including a top wall, a bottom wall opposite the top wall, a front wall, a rear wall opposite the front wall of the insert cartridge, a pair of opposing side walls extending between the top wall of the insert cartridge and the bottom wall of the insert cartridge; and a wedge clamp including a top wall, a bottom wall opposite the top wall of the wedge clamp, a front wall, a rear wall opposite the front wall of the wedge clamp, and a pair of opposing side walls extending between the top wall of the wedge clamp and bottom wall of the wedge clamp, the rear wall of the wedge clamp including a cylindrical member extending therefrom, the cylindrical member received in the recess of the side wall of the pocket, the front wall of the wedge clamp including a threaded bore and the cylindrical member including a threaded inner surface for receiving a threaded member, the cylindrical member being defined by a central longitudinal axis which is parallel to the bottom wall of the pocket, wherein movement of the wedge clamp in a radial direction relative to the insert cartridge causes the cylindrical member of the wedge clamp to exert a force vector into the body of the cutting tool at a location that is radially inward with respect to an adjacent pocket of the cutting tool, thereby reducing deflection of the adjacent pocket of the cutting tool when the cutting tool is placed in a locked condition, wherein, in the locked condition, the bottom wall of the insert cartridge engages the bottom wall of the pocket, wherein the top wall of the insert cartridge includes a first portion extending from one of the pair of opposing side walls of the insert cartridge and a second portion extending from the first portion, the first and second portions not coinciding with a blade or cutting insert, wherein the second portion is formed at an acute and non-zero angle with respect to the first portion, and wherein the second portion acts as a seating surface for the wedge clamp to resist the insert cartridge from sliding out of the pocket during a cutting operation.

13. The cutting tool according to claim 12, wherein the threaded member exerts a force vector in the radial direction when threaded into the wedge clamp to place the cutting tool in the locked condition.

14. The cutting tool according to claim 12, wherein the first portion of the top wall of the insert cartridge extends a first distance from the one of the pair of opposing side walls of the insert cartridge and the second portion of the top wall of the insert cartridge extends a second distance from the first portion of the top wall of the insert cartridge.

15. The cutting tool according to claim 12, wherein the insert cartridge further includes an insert pocket formed in the top wall of the insert cartridge at an intersection between the front wall of the insert cartridge and one of the side walls of the insert cartridge for receiving a cutting insert.

16. The cutting tool according to claim 12, wherein the top wall of the wedge clamp is formed at an angle with respect to the bottom wall of the wedge clamp such that a thickness of the wedge clamp is largest proximate the front wall and smallest proximate the rear wall.

17. The cutting tool according to claim 1, wherein the acute and non-zero angle is between about 5 degrees and about 15 degrees.

18. The cutting tool according to claim 3, wherein the second distance is greater than the first distance.

19. The cutting tool according to claim 3, wherein the second portion of the top wall of the insert cartridge extends the second distance to the other one of the pair of opposing side walls of the insert cartridge.

20. The cutting tool according to claim 1, wherein engagement of the bottom wall of the wedge clamp with the top wall of the insert cartridge results in a third force vector, parallel to the first force vector and substantially perpendicular to the second force vector, which urges the side wall of the insert cartridge toward the side wall of the pocket.

21. The cutting tool according to claim 20, wherein engagement of the bottom wall of the wedge clamp with the top wall of the insert cartridge results in a fourth force vector, substantially parallel and opposite with respect to the second force vector, which urges the bottom wall of the insert cartridge toward the bottom wall of the pocket.

* * * * *